Patented June 12, 1951

2,556,845

UNITED STATES PATENT OFFICE 2,556,845

PRODUCTION OF VINYL PYRIDINE COMPOUNDS

Harry F. Kauffman, Jr., Urbana, Ill., assignor to Allied Chemical & Dye Corporation, New York, N. Y., a corporation of New York No Drawing. Application August 21, 1947, Serial No. 769,989

12 Claims. (Cl. 260—290)

This invention relates to the production of monovinyl products from compounds containing an aromatic six membered single-nitrogen heterocyclic ring with a reactive methyl group attached to said ring, by dehydration of the methylol derivatives of said compounds. According to a preferred embodiment of my invention, homologues of pyridine containing a methyl group substituent in a reactive position are reacted to produce monovinyl derivatives by methods hereinafter described.

The prior art discloses that a monomethylol derivative of a pyridine homologue containing a methyl group substituent in a reactive position may be prepared by condensing formaldehyde with said pyridine homologue. It is also known that after recovering the monomethylol derivative from the resulting reaction product containing numerous by-products, tar, etc., the monomethylol derivative may be dehydrated to produce the corresponding monovinyl compound by distillation in the presence of potassium hydroxide.

For the purpose of brevity, compounds containing the aromatic six membered single-nitrogen heterocyclic ring (such as homologues of pyridine, as employed in a preferred embodiment of my invention), with a reactive methyl group attached to said ring will hereinafter be designated as tar bases, but it is understood that this designation refers only to compounds having such structure.

The word "dehydration" as used herein means the removal of the elements of water from adjacent carbon atoms in a molecule to produce an unsaturated linkage.

I have now discovered that by heating in the presence of a strong alkaline agent the mixture of reaction products resulting from the condensation of tar bases and formaldehyde, the yields of monovinyl compounds may be greatly increased as compared with the yields obtained when the monomethylol compounds are first recovered from the reaction mixture and then treated to convert them to the vinyl compounds. By virtue of that discovery, two important advantages are obtained. First, an economy is effected by saving the cost of purification of the monomethylol compound, and secondly, an improvement in yield is obtained by virtue of the fact that compounds in the crude reaction mixture other than the monomethylol compound react to produce monovinyl products under the same conditions under which monomethylol compounds are dehydrated to form the vinyl compounds. I have obtained yields of monovinyl products as high as 114% of theoretical based on the actual monomethylol compound present in the crude reaction mixture. In contrast thereto, when the monomethylol compound was recovered and subjected to the same treatment, yields of the monovinyl products of about 87% of theoretical based on the monomethylol compounds treated, are obtained. Thus, I may obtain by the process of this invention over 30% more monovinyl compound than by recovering the monomethylol compound and treating it to convert it into the vinyl compound.

The high yield of monovinyl compounds obtainable by the process of my invention are attributed to the fact that products other than monomethylol compounds are present in the mixture of reaction products of the tar base-formaldehyde condensation and these other products are converted to monovinyl compounds. In particular, polymethylol compounds are present and under the same conditions of treatment with a strong alkaline agent which dehydrate monomethylol compounds to monovinyl compounds, the polymethylol compounds undergo reactions in addition to loss of water and are thereby converted to monovinyl compounds. My invention, therefore, extends not only to the treatment of mixtures of the reaction products of condensing tar bases with formaldehyde, but also to the treatment of polymethylol derivatives of tar bases, however obtained, to convert them to monovinyl compounds by heating the polymethylol compounds in the presence of a strong alkaline agent.

The crude reaction products suitable for treatment to form monovinyl compounds by the process of my invention may be synthesized by reacting tar bases with formaldehyde according to methods disclosed by the prior art. For example, a tar base containing one or more methyl radicals substituted in a reactive position on the pyridine nucleus may be condensed with formaldehyde by heating under pressure at 100° to 160° C. for 7 to 20 hours. Water may be present and mol ratios of tar base to formaldehyde of 2:1 or 1:1 may be employed. As is well known, methyl substituents in the alpha and gamma positions of the pyridine nucleus are reactive, and as a result of treatment with formaldehyde, a hydrogen in such group may be replaced by a methylol group.

The procedures followed and optimum conditions employed in treating a mixture of reaction products resulting from the condensation of tar bases and formaldehyde or of treating polymethylol derivatives of tar bases with a strong alkaline agent to form vinyl compounds will depend upon the particular agent used, the amounts and nature of the methylol compounds present, and the amounts of water, unreacted tar base, or other materials present in the reaction mixture as well as other conditions under which the process is carried out. Such strong alkaline agents as caustic alkalies (sodium or potassium oxides or hydroxides), or sodium or potassium carbonates, or quaternary ammonium compounds may be used.

The reaction conditions comprise a high enough temperature to bring about dehydration of the methylol compounds, and to split formaldehyde from the polymethylol compounds in the presence of the strong alkaline agent. The temperature required will depend upon the concentration of strong alkaline agent and of the methylol compounds present in the mixture to be treated. Higher concentrations of said agent or of methylol compounds will tend to bring about dehydration of the methylol compounds at a lower temperature. Further, the temperature should be maintained below that at which substantial decomposition, polymerization or other side reactions occur. The temperatures which should be employed for the dehydration reaction in my preferred process are in the range 60° C. and higher for polymethylol derivatives of homologues of pyridine or other high molecular weight tar bases.

Since vinyl compounds in general tend to polymerize when they are heated, it is preferred to remove them from the reaction mixture in the same step as that in which they are formed. This may conveniently be done by distilling the monovinyl product. In order to maintain the temperature in the proper range for dehydration of methylol compounds while removing the monovinyl product by distillation, various means may be employed such as heating under a reduced pressure or passing an inert gas through the reaction mixture while maintaining the required temperature. In distilling crude reaction mixtures from the condensation of formaldehyde with a tar base the vinyl compounds distill after most of the materials boiling at a lower temperature than the vinyl compounds, e. g. formaldehyde, water and unreacted tar base, have distilled. A secondary but beneficial effect of the initial removal of this water and unreacted tar base, in addition to permitting the removal of the monovinyl derivative in the same step as that in which it is formed, is that the methylol compounds and the dehydrating agent thereby become more concentrated, and the dehydration of the methylol compounds takes place at lower temperatures. The distillation is preferably carried out under reduced pressure. Therefore, in my preferred procedures for treating a crude reaction mixture of the condensation of a tar base and formaldehyde, formaldehyde, free water and unreacted tar base are distilled at a reduced pressure and a temperature sufficiently low to prevent substantial dehydration or decomposition of the methylol compounds. The distillation is continued at a temperature above 60° C. with reduced pressures low enough to cause distillation of the product; preferably as low pressures as may conveniently be maintained should be used in order to induce distillation at relatively low temperatures. For this purpose the temperatures which I employ for forming and distilling over the monovinyl compounds formed from polymethylol derivatives of homologues of pyridine such as picolines, lutidines and collidenes are in the range 80–110° C. For polymethylol derivatives of homologues of quinoline, temperatures in the range 130–160° C. are employed. Polymerization inhibitors may be added to the reaction mixture to retard polymerization of the vinyl compounds.

My invention is not limited, however, to procedures in which the monovinyl product is distilled over in the same heating step as that in which the polymethylol compounds are decomposed. In some cases, it may be expedient to remove said product after the completion of the reactions forming the vinyl compounds. Fractionation under vacuum, solvent extraction, precipitation or other techniques may be found suitable for the removal of the vinyl product in such cases. In still other cases, it may be desired to employ the mixture of monovinyl compound and by-products present after the dehydration reaction in some further operation, in which case no separation of the monovinyl compounds would be carried out.

I prefer to use a caustic alkali as a dehydrating agent. The required amount of such agent will depend upon the temperature employed, and other factors, as indicated above. I find that, in my preferred process as described above (in which water and unreacted tar base are first removed), about 4% by weight of such agent, based on the amount of the reaction mixture present when the dehydration reaction occurs, is sufficient, but any additional amount may be used. A smaller amount may also be used, but if this amount is substantially less than 4%, incomplete dehydration may result. The alkaline agent may be added at any convenient time during the process; that is, it may be added before the removal of unreacted tar base and water, or afterward. I generally prefer to add it before such removal since continuity of operation is thereby obtained.

Monovinyl derivatives of any tar base may be synthesized by the process of my invention. This comprises derivatives of quinoline as well as of pyridine. In the preferred form of my invention monovinyl derivatives of homologues of pyridine containing a reactive methyl group, such as aldehyde collidine (2-methyl-5-ethyl pyridine), 2,4-lutidine (2,4-dimethyl pyridine), 2-picoline or 4-picoline are produced. Accordingly, the invention will be further illustrated by the following examples of procedures for the production of these vinyl compounds.

*Example 1.*—100 mol parts of 2,4-lutidine were mixed with 50 mol parts of formaldehyde as commercial 37% formalin and the pH of the mixture was adjusted by adding thereto about 3% carbon dioxide. The mixture was charged into a stainless steel bomb and placed under an atmosphere of hydrogen. The bomb was closed and heated to 209°–215° C. for 25 minutes, and then cooled rapidly to room temperature.

The crude reaction mixture thus obtained was treated with 20 grams of solid sodium hydroxide per kg. of crude reaction mixture, an amount which will produce a caustic concentration of 5.3% after the removal of water and unreacted lutidine, as determined by previous experiments run under the same conditions, and heated in a still pot to 50°–60° C. while maintaining a pressure of 100 mm. of mercury absolute. Free water was distilled off as a water-lutidine azeotrope. During this step of the distillation, the pressure was progressively reduced until a pressure of 15 mm. was reached. The pot temperature was maintained at 50°–60° C. When substantially all of the free water had been distilled over, the distillation was continued at 15 mm. pressure and unreacted lutidine was taken overhead. Following the removal of the lutidine, an intermediate and crude vinyl cut were removed at 105°–110° C. pot temperature and 15 mm. pressure.

The moist intermediate and crude vinyl cuts were dried with caustic and redistilled through a rectification column under 20 mm. pressure while progressively adding o-aminophenol in solution in the monovinyl derivative near the top of the column to inhibit polymerization of the vinyl compound. In this redistillation, 28.5 mols of a mixture of the two monovinyl derivatives of lutidine were obtained for every 100 mols of lutidine originally charged. The yield of monovinyl products based on the monomethylol products in the crude reaction mixture was 114%.

*Example 2.*—100 mol parts of 2-methyl-5-ethyl pyridine (aldehyde collidine) were mixed with 50 mol parts of formaldehyde as commercial 37% formalin and the mixture was charged into a stainless steel bomb where it was placed under an atmosphere of hydrogen. The closed bomb was heated to 200° C., 70 minutes being required in raising the temperature from 140° C. to 200° C., followed by a period of 30 minutes at 200°–207° C. The bomb was allowed to cool.

The crude reaction mixture thus obtained was agitated in a distillation pot with 20 g. solid sodium hydroxide per kg. of crude reaction mixture and 0.0009 mol parts of o-aminophenol until most of the sodium hydroxide had dissolved. Heat was then applied to the pot causing distillation under reduced pressure beginning at 100 mm. of mercury absolute. Free water was distilled off as a water-collidine azeotrope while progressively reducing the pressure to 14 mm. When substantially all of the free water had been distilled over, the distillation was continued at 14 mm. pressure and unreacted aldehyde collidine was taken overhead. Following the removal of the collidine, intermediate and crude vinyl cuts were removed at 11.5 mm. pressure.

The moist intermediate and crude vinyl cuts were then dried with caustic. Refractive indices of these cuts indicated a total content of 22.8 mols of 2-vinyl-5-ethyl pyridine for every 100 mols of aldehyde collidine charged. Of this amount 22.3 mols were obtained in a dried crude vinyl cut of 93.5% purity.

*Example 3.*—100 mol parts of 2-picoline and 50 mol parts of formaldehyde as commercial 37% formalin were mixed and charged into a stainless steel bomb. An atmosphere of hydrogen was introduced and the closed bomb was heated at 200–242° C. for 35 minutes. The bomb was cooled quickly and the crude reaction mixture was removed to a distillation pot.

To the pot were added 32 grams of sodium hydroxide pellets per kg. of crude reaction mixture and 0.001 mol parts of tertiary butyl catechol. The pot was heated sufficiently to cause distillation at a pressure of 88 mm. of mercury absolute. After separation of water-picoline azeotrope and a picoline fraction the heating was continued under a pressure of 87–100 mm. while taking off a crude 2-vinyl pyridine cut. Total yield of 2-vinyl pyridine as determined from refractive indices of dried fractions was 26 mols for every 100 mols of 2-picoline originally charged. Of this amount 24.8 mols were obtained in a dried crude vinyl fraction of 90.5% purity.

*Example 4.*—100 mol parts of 4-picoline and 50 mol parts of formaldehyde as commercial 37% formalin were mixed and closed in a stainless steel bomb under an atmosphere of hydrogen. The bomb was heated to 205° C. and then held between this temperature and 217° C. for 35 minutes.

The bomb was cooled and the crude reaction mixture was transferred to a distillation pot. Following addition of 30 grams of sodium hydroxide pellets per kg. of crude reaction mixture, and 0.0009 mol parts of o-aminophenol, sufficient heat was applied to the pot to initiate distillation at a pressure of 117 mm. of mercury absolute. Pressure was gradually reduced to the range 18–21 mm. while removing water and unreacted 4-picoline. Heating was continued under the latter pressure while intermediate and crude cuts of 4-vinyl pyridine were distilled. These contained a total of 16.1 mols of 4-vinyl-pyridine for every 100 mols of 4-picoline charged, measured by refractive indices of dried fractions. Pure 4-vinyl pyridine was obtained by rectification of these fractions.

In the processes of the foregoing examples the entire crude reaction mixture obtained by condensing tar bases with formaldehyde, including unreacted tar base, water and all byproducts of the reaction, was subjected to treatment with caustic alkali to obtain monovinyl compounds. This represents the preferred form of my invention but, as pointed out heretofore, the invention is not limited thereto. Thus, the crude reaction product of the condensation step may be fractionally distilled, preferably under reduced pressure, to remove therefrom free water and unreacted tar base, leaving a residue containing a mixture of monomethylol derivatives and polymethylol derivatives of the tar base and other products formed in the condensation step. To this residue a strong alkaline agent may be added and the mixture heated as in the foregoing examples to distill over a fraction of vinyl derivative of the tar base.

In another modification of my invention, a residue such as obtained in the manner just described, may be further distilled to recover a fraction containing mono- and polymethylol compounds separated from other products in the crude reaction mixture. This methylol fraction is then treated in the manner described to form monovinyl compounds.

While the foregoing methods are not preferred procedures, in some cases they may have certain advantages and be desirable procedures for attaining important objectives of my invention. Less advantageously but, nevertheless, a practical procedure for accomplishing in part the objectives of my invention, is to treat the crude reaction mixture to separately recover therefrom monomethylol and polymethylol derivatives of the tar base. The polymethylol derivatives may then be treated in the manner heretofore described to heat them with a strong alkaline agent and thereby convert the polymethylol derivatives to monovinyl compounds.

The polymethylol derivatives of tar bases which may be converted into monovinyl compounds by the process of my invention are characterized by containing the aromatic six membered single-nitrogen heterocyclic ring substituted by one or more methyl side chains in reactive position as heretofore described, which side chains are substituted by a total of at least two methylol radicals (—CH₂—OH). In a more preferred form of my invention, the polymethylol derivatives which may be so converted are pyridines (such as pyridine or a homologue of pyridine) substituted by one or more methyl side chains in reactive position which side chains are substituted by a total of at least two methylol radicals. These polymethylol compounds may be illustrated by the formula

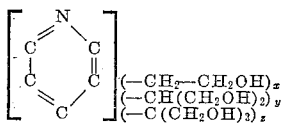

where the values of $x$, $y$ and $z$ individually and the sum of $x+y+z$ are less than 4 and when the sum of $y+z$ is zero the value of $x$ is greater than 1, and the substituent groups indicated are in the alpha or gamma positions with respect to the nitrogen.

I claim:

1. The process for producing a monovinyl compound which comprises incorporating not less than about 4% by weight of a strong alkaline agent with a preformed compound containing an aromatic six membered single-nitrogen heterocyclic ring with a total of at least two methylol groups substituted on methyl substituent in reactive position on said ring, and then heating said compound in the presence of said alkaline agent at temperatures at which formaldehyde and water are split off from said compound to form said monovinyl compound.

2. The process for producing a monovinyl compound which comprises incorporating not less than about 4% by weight of a strong alkaline agent with a preformed pyridine having a total of at least two methylol groups substituted on methyl substituent in reactive position on said pyridine, and then heating said pyridine in the presence of said alkaline agent at temperatures at which formaldehyde and water are split off from said pyridine to form said monovinyl compound.

3. The process for producing a monovinyl compound from a crude mixture of reaction products of the condensation of formaldehyde with a homologue of pyridine having a reactive methyl group, said mixture comprising polymethylol derivative of said homologue formed by said condensation, which comprises incorporating with said reaction products not less than about 4% caustic alkali based on the weight of said crude products less any accompanying unreacted homolog of pyridine and water, and then heating said mixture in the presence of said caustic alkali at temperatures at which water and formaldehyde are split off from said polymethylol derivative to form said monovinyl compound.

4. The process for producing a monovinyl compound from a crude mixture of reaction products of the condensation of formaldehyde with a compound containing the aromatic six membered single-nitrogen heterocyclic ring with a reactive methyl group attached to said ring, said mixture comprising polymethylol derivative formed in said condensation, which comprises heating said mixture in the presence of not less than about 4% of a strong alkaline agent based on the weight of said crude mixture of reaction products less any accompanying unreacted compound containing the aromatic six membered single nitrogen heterocyclic ring and water at temperatures at which water and formaldehyde are split off from said polymethylol derivative to form said monovinyl compound.

5. The process for producing a monovinyl derivative of a homologue of pyridine from a crude reaction mixture of the condensation of formaldehyde with a homologue of pyridine having a reactive methyl group, said mixture comprising polymethylol derivative of said homologue formed by said condensation, which comprises removing unreacted homologue of pyridine and water from said crude reaction mixture and then heating the remaining mixture of reaction products still containing said polymethylol derivative in the presence of not less than about 4% by weight of a strong alkaline agent at temperatures at which water and formaldehyde are split off from said polymethylol derivative to form said monovinyl derivative.

6. The process for producing a monovinyl derivative of a homologue of pyridine from a crude reaction mixture of the condensation of formaldehyde with a homologue of pyridine having a reactive methyl group, said mixture comprising the condensation reaction products including monomethylol and polymethylol derivatives of said homologue of pyridine formed by said condensation, which comprises incorporating with said reaction products not less than about 4% caustic alkali based on the weight of said crude reaction mixture less unreacted homolog of pyridine and water contained therein, removing material present in said crude reaction mixture boiling lower than said monomethylol and polymethylol derivatives from said mixture by distillation, and heating the remaining mixture of reaction products still containing said polymethylol derivative in the presence of said caustic alkali at temperatures at which water and formaldehyde are split off from said polymethylol derivative to form said monovinyl derivative.

7. The process for producing a monovinyl derivative of a homologue of pyridine from a crude reaction mixture of the condensation of formaldehyde with a homologue of pyridine having a reactive methyl group, said mixture comprising monomethylol and polymethylol derivatives of said homologue of pyridine formed by said condensation, which comprises adding to said reaction mixture not less than about 4% caustic alkali based on the weight of said reaction mixture less the unreacted homolog of pyridine and water contained therein, removing material present in said crude reaction mixture boiling lower than said monomethylol and polymethylol derivatives from said mixture by distillation, and heating the remaining mixture of reaction products still containing said polymethylol derivative in the presence of said caustic alkali at temperatures at which water and formaldehyde are split off from said polymethylol derivative to form said monovinyl derivative and distilling off monovinyl pyridines in the same heating step.

8. The process for producing a monovinyl derivative of a homologue of pyridine from a crude reaction mixture of the condensation of formaldehyde with a homologue of pyridine having a reactive methyl group, said mixture comprising monomethylol and polymethylol derivatives of said homologue of pyridine formed by said condensation, which comprises adding to said reaction mixture not less than about 4% caustic alkali based on te weight of said reaction mixture less the unreacted homolog of pyridine and water contained therein, removing water and unreacted homologue of pyridine from said mixture by distillation under vacuum, and heating the remaining mixture of reaction products still containing said polymethylol derivative in the presence of said caustic alkali at temperatures at which water and formaldehyde are split off from said polymethylol derivative and water in split off from said monomethylol derivative to form said monovinyl derivative and distilling off under vacuum monovinyl pyridines in the same heating step.

9. The process for producing 2-vinyl, 5-ethyl pyridine from a crude reaction mixture of the condensation of formaldehyde with 2-methyl, 5-ethyl pyridine, said mixture comprising the monomethylol and polymethylol derivatives of said 2-methyl, 5-ethyl pyridine formed by said condensation, which comprises removing water and unreacted 2-methyl, 5-ethyl pyridine from said mixture by distillation, adding a strong alkaline agent to said reaction mixture, and heating the remaining mixture of reaction products still containing said polymethylol derivative in the presence of not less than about 4% by weight of said strong alkaline agent at temperatures at which water and formaldehyde are split off from said polymethylol derivative to form said 2-vinyl, 5-ethyl pyridine.

10. The process for producing monovinyl derivatives of 2,4-lutidine from the crude reaction product mixture of the condensation of formaldehyde in an aqueous solution with 2,4-lutidine, said mixture comprising monomethylol and polymethylol derivatives of 2,4-lutidine, unreacted 2,4-lutidine, high boiling by-products and water, which comprises adding to said crude reaction mixture at least 4 grams of sodium hydroxide for every 100 grams of said monomethylol and polymethylol derivatives and high boiling by-products, distilling off substantially all the water originally in said reaction mixture under a reduced pressure not above about 100 mm. of mercury absolute, after the removal of said water continuing said distillation with progressive reduction in pressure to not above about 15 mm. of mercury absolute and at temperatures at which the remaining unreacted 2,4-lutidine is removed, said methylol derivatives are converted to monovinyl compounds and said monovinyl compounds are substantially completely distilled from said mixture.

11. The process for producing 2-vinyl, 5-ethyl pyridine from the crude reaction mixture of the condensation of formaldehyde with 2-methyl, 5-ethyl pyridine, said mixture comprising the monomethylol and polymethylol derivatives of said 2-methyl, 5-ethyl pyridine formed by said condensation, and unreacted 2-methyl, 5-ethyl pyridine which comprises removing water and unreacted 2-methyl, 5-ethyl pyridine from said mixture by distillation under vacuum, and heating the remaining mixture of reaction products still containing said polymethylol derivative in the presence of not less than about 4% by weight of caustic alkali at temperatures at which water and formaldehyde are split off from said polymethylol derivative and water is split off from said monomethylol derivative to form said 2-vinyl, 5-ethyl pyridine.

12. The process for producing 2-vinyl, 5-ethyl pyridine from the crude reaction product mixture of the condensation of formaldehyde in an aqueous solution with 2-methyl, 5-ethyl pyridine, said mixture comprising the monomethylol and polymethylol derivatives of 2-methyl, 5-ethyl pyridine formed by said condensation, unreacted 2-methyl, 5-ethyl pyridine, high boiling by-products and water which comprises adding to said crude reaction mixture at least 4 grams of sodium hydroxide for every 100 grams of said monomethylol and polymethylol derivatives and high boiling by-products, distilling off substantially all the water originally in said reaction mixture under a reduced pressure not above about 100 mm. of mercury absolute, after the removal of said water continuing said distillation with progressive reduction in pressure to not above about 14 mm. of mercury absolute and at temperatures at which the remaining unreacted 2-methyl, 5-ethylpyridine is removed, said methylol derivatives are converted to monovinyl compounds and said monovinyl compounds are substantially completely distilled from said mixture.

HARRY F. KAUFFMAN, Jr.

REFERENCES CITED

The following references are of record in the file of this patent:

Ladenburg: Berichte, vol. 22, 1889, pp. 2583–2585.

Maier: "Das Pyridine und seiner Derivatives," 1934, pp. 58, 202, 31, 43, 191, 44, 192, 194, 201, 188.

Frank: J. American Chem. Soc., July 1946, vol. 68, pp. 1368–1369.